Aug. 15, 1944.  G. R. BICKNELL  2,355,699
METHOD OF IRONING SHIRTS
Filed Feb. 7, 1941  8 Sheets-Sheet 1

INVENTOR
GEORGE R. BICKNELL
BY Hyde and Meyer
ATTORNEYS

Aug. 15, 1944.  G. R. BICKNELL  2,355,699
METHOD OF IRONING SHIRTS
Filed Feb. 7, 1941  8 Sheets-Sheet 2

INVENTOR
GEORGE R. BICKNELL
BY 
ATTORNEYS

Aug. 15, 1944.  G. R. BICKNELL  2,355,699
METHOD OF IRONING SHIRTS
Filed Feb. 7, 1941  8 Sheets-Sheet 3

INVENTOR
GEORGE R. BICKNELL
BY *Hyde and Meyer*
ATTORNEYS

Aug. 15, 1944.   G. R. BICKNELL   2,355,699
METHOD OF IRONING SHIRTS
Filed Feb. 7, 1941   8 Sheets-Sheet 4

INVENTOR
GEORGE R. BICKNELL
BY
*Hyde and Meyer*
ATTORNEYS

Aug. 15, 1944.　　　G. R. BICKNELL　　　2,355,699
METHOD OF IRONING SHIRTS
Filed Feb. 7, 1941　　　8 Sheets-Sheet 5

INVENTOR
GEORGE R. BICKNELL
BY
Hyde and Meyer
ATTORNEYS

Aug. 15, 1944.   G. R. BICKNELL   2,355,699
METHOD OF IRONING SHIRTS
Filed Feb. 7, 1941   8 Sheets-Sheet 7

INVENTOR
GEORGE R. BICKNELL
BY Hyde and Meyer
ATTORNEYS

Patented Aug. 15, 1944

2,355,699

UNITED STATES PATENT OFFICE 2,355,699

METHOD OF IRONING SHIRTS

George R. Bicknell, Antioch, Ill., assignor to The American Laundry Machinery Company, Norwood, Ohio, a corporation of Ohio Application February 7, 1941, Serial No. 377,923

4 Claims. (Cl. 223—57)

This invention relates to improvements in a method for finishing men's shirts by completely smoothing or ironing them without the use of a hand iron, in a shorter time than has heretofore been thought possible and producing a high quality of finish with less operator fatigue.

One of the advantages of the present invention is that the parts of the shirt are ironed or finished in such order that the parts which are first finished thereafter receive the least possible handling to cause mussing or wrinkling and the least contact with still dampened portions of the shirt which would obviously cause blemishes in the finished surfaces. In accomplishing this purpose the parts of most importance to the customer are finished last. For instance, the sleeve portions are completely finished before the cuffs are ironed, thus preserving a fine finish on the cuffs. The shirt body and collar are ironed in such a fashion as to preserve a good finish on the collar, and the shirt front is ironed last.

A novel step in the method is the ironing of the shirt front last which has heretofore been though impossible because the shirt front dried out so much if other operations were performed previously that a good finish was impossible without dampening the shirt and it was difficult or impossible to get a positive dampening of the shirt front without consuming a lot of time and without damaging previously finished parts, such as the collar. One of the objects of the present invention therefore is to provide means and a method for quickly and positively dampening the shirt front while protecting previously ironed parts.

Another object of the present invention is to so divide the duties of each operator that she is reasonably busy at all times and each operator is able to turn out her portion of a completely finished shirt in a standard time interval although one operator may have a different number of shirts in process in her portion of the system than another operator in order to balance the functioning of the different parts of the system.

Another feature of the present invention is the organization and distribution of duties between operators in such manner that each operator is assigned and works upon and becomes expert with respect to one or more specific portions of the shirt, with the operations or method steps which she controls or produces being divided along definitely predetermined lines. Coupled with this arrangement are the order and planned arrangement of the duties of the several operators, based roughly upon the thickness or relative thickness of various portions of the shirt to be ironed by each operator. For instance, a quite important part of a complete shirt ironing operation is the finishing of those two parts of the shirt which may be called the multiple thickness parts, to-wit, the cuffs and the collar portion. By this term "collar portion," in the specification and claims, I include either the neckband of a negligee shirt or the neckband and collar together of a collar-attached shirt. Both the cuffs and the "collar portion," usually lined, ordinarily include the maximum number of layers, folds or thicknesses of material to be dried out during an ironing operation. They are difficult to iron thoroughly, as are also the button and buttonhole strips, although the latter are usually not nearly so thick as the collar portion or the cuffs, which demand the most thorough attention. Some other shirt parts, such as pockets, button and buttonhole strips, etc., involve several thicknesses and to some extent modify the ironing requisites, but not so much as the collar and cuffs. One of the features of this invention is the provision of an especially hot collar press, associated with means for ironing other single thickness shirt parts, with this particular operator's motions and duties so ingeniously organized and associated that a collar is under ironing pressure in the closed collar press for a major portion of the standard ironing period or time interval, a period much longer than the time necessary for producing a single ironing effect upon any single thickness portion of the shirt. In like manner, the cuff portion of the shirt is a determining factor in organizing the manipulations and control motions of another operator, although the cuff and gusset press usually is not closed for so long a period as the collar press, because ordinarily fewer layers or thicknesses of fabric require to be dried out during the cuff ironing operation. In like manner, less time ordinarily would be required for ironing the front of the shirt than for either the collar portion or cuffs, because here the lesser extra thickness is at the pocket or along the button and buttonhole strips (which are not superposed during ironing), although even here, additional moisture is supplied to the shirt front, just before ironing the same, which entails some extra ironing time to remove the last traces of moisture and insure a fine finish, so that the time period for ironing the shirt front actually may be more than for other single thickness parts of the shirt.

Another advantage of the present invention is that it provides an ironed finish on the outer surfaces of the sleeves, but without any necessity for the operator running her hand through the sleeves to open them up, as is necessary where they stick together during the usual ironing operation with the sleeves finished by ironing only on their outer surfaces. This is accomplished by reason of the novel use of heated internal sleeve forms for partially drying the sleeves, followed by an external hot pressing operation to complete the finish.

Since finished shirts are usually delivered to the customer in folded form, one of the objects of the present invention is to provide improved means and method to aid a single operator to fold the shirts in the standard unit of time required for each of the ironing operators to complete her portion of one shirt. Among other novel features of the folding system provided is the provision of means for producing an ironing operation on a small portion of the yoke not reached by any of the other equipment and often finished by hand and which is here accomplished along with the folding operation and practically without conscious attention from the operator.

Other novel features of the method here disclosed include the arrangement of the various parts and groups thereof so as to save steps and time for the operators, to permit the simultaneous opening and closing of the presses where necessary, to permit the storage of partially finished shirts in handy position between various operators in the system and to facilitate the movement of shirts from one group of operations to the next with the minimum manipulation by the operators.

Other advantages and functions of my improved method will be apparent from the accompanying drawings and description and the essential features thereof will be summarized in the claims.

Briefly stated, the order in which the parts of a shirt are ironed in the method here disclosed is as follows: The sleeves are first partially dried on heated sleeve forms and are then ironed on their outer surfaces by placing the sleeves flat in a press while protecting the cuffs from the heated ironing surfaces. This operation also irons the plackets of the sleeves. The cuffs and gusset portions of the sleeves are then ironed after which the collar portion and all of the body except the front are ironed. While for various reasons as will later appear, I here disclose method and apparatus arranged to iron the collar before the shirt body, it would be possible to reverse these two operations but in any case the entire shirt including the back yoke portion and everything else except the shirt front itself is completely ironed before the last operation takes place. During this time the shirt front has dried out sufficiently so that it is not in suitable condition for a proper ironing operation, because rough dry spots are likely to be produced. Therefore the last operation includes both the positive dampening of the entire shirt front while protecting previously ironed parts from moisture, and also the ironing of the entire shirt front including the tails. The finished shirt then may be handled in any desired manner but obviously the customary operation will be to fold the shirt. Accordingly, I have provided specific folding apparatus for aiding the operator in performing this duty and including if necessary heated ironing shoes on the folding table for ironing a small portion of the front yoke of the shirt at that time if necessary and desirable.

It is inherent in the foregoing method that there are no parts of the shirt remaining to be touched up or ironed by hand because the machines and their operations are so chosen, organized and arranged that every part of the shirt receives the most suitable finish and the arrangement of the method steps is such that previously finished parts are always protected against subsequent mussing, wrinkling or dampening, with the assurance of producing and retaining high quality ironing effects.

Figures 1, 2, 3, 4, 5:
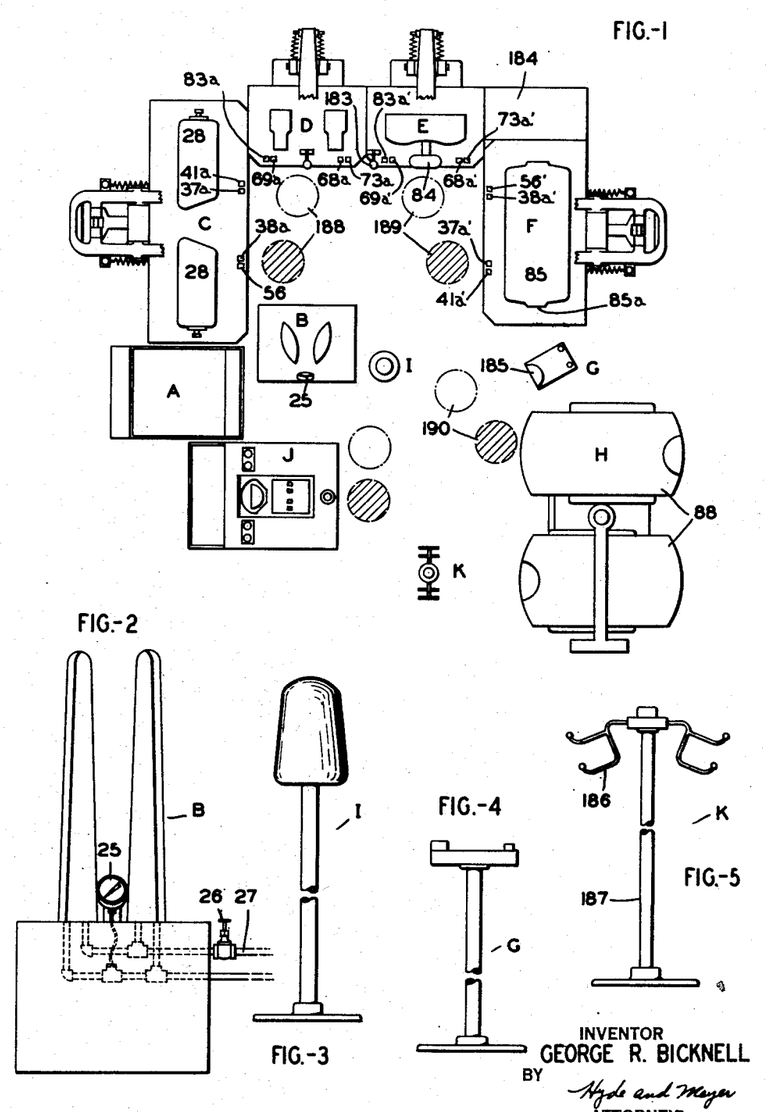
Fig. 1 is a diagrammatic plan view of the complete shirt finishing unit including a number of pieces of apparatus.
Fig. 2 is a front elevation of sleeve forms.
Fig. 3 is an elevation of a collar rack.
Fig. 4 is an elevation of a yoke rack.
Fig. 5 is an elevation of a revolving rack.

The specific apparatus by which the above described method may be carried out may vary considerably but I have here disclosed specific equipment adapted to carry out these functions. In Fig. 1 I have shown diagrammatically a damp box A for holding shirts to be finished in the unit; at B are shown two heated sleeve forms preferably thermostatically controlled; at C is a sleeve and placket press; D is a cuff and gusset press; E is a collar press; F is a body press for the back and sides of the shirt; G is a yoke rack; H is a front press; I is a collar rack; J is a folding table; and K is a revolving rack.

It will be noted from an inspection of Fig. 1 that the arrangement of the parts here shown is generally U-form in floor plan, which arrangement places the operators close enough to each other so that they may aid each other where necessary, and also provides a corner-adjacent relationship between presses C and D and their operations as one group, and presses E and F as another group, so as to facilitate certain tandem machine operations as will later appear.

Sleeve forms

The sleeve forms shown at B are of the usual tapered form having polished metal surfaces and heated by steam or otherwise and preferably having a thermostatic control at 25 or, in any event, a thermometer visible to the operator, so that by adjusting a thermostat or a manual control valve such as shown at 26 in Fig. 2 on the inlet steam line 27, proper temperature of the sleeve forms may be maintained. This is usually between 220° F. and 260° F. depending upon the speed of passage of shirts through the unit, and wetness of the goods and other factors. The important point is that the scheme of controlling and other manipulations of the operator permit the sleeves to remain on the forms, subsequent to their ironing effect applied to the internal sleeve surfaces, for a limited and definite period of time during which the sleeves are only partially dried, but nevertheless sufficiently so that they will not stick together in the sleeve press C during a subsequent external ironing operation. Therefore a careful setting of the temperature of the sleeve forms is necessary.

Sleeve press

Figure 7:
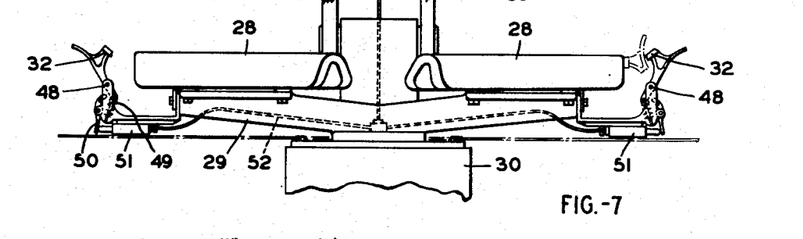
Fig. 7 is a fragmental view showing a front elevation of the bucks of the sleeve press of Fig. 6.

The parts here shown at C form the subject matter of a copending application of Fred A. Heidenfelder and myself, Serial No. 377,926, filed February 7, 1941, to which reference may be had for a more complete description if necessary. Briefly stated, a pair of bucks 28 are mounted on a common arm 29 which is supported in the frame 30 for vertical movement into and out of engagement with coacting pressing head 31. The bucks 28 as shown in Figs. 1 and 7 are longitudinally alined and spaced apart sufficiently at the center of the press to permit the body of the shirt to lie between the bucks while each of the sleeves is supported from shoulder to cuff on one of the bucks 28, preferably with the sleeve placket facing upwardly and arranged in a two thickness smooth lay with each cuff held away from contact with the heated pressing head 31 by means of a clamp 32. The bucks 28 are preferably either flat or slightly convex upwardly so as to give the best lay of the sleeve. When the head is brought down, the sleeves, excepting the cuffs, are completely dried and ironed by the application of the heated ironing or pressing surfaces to the external surfaces of the sleeves, as will be obvious.

Figure 6:
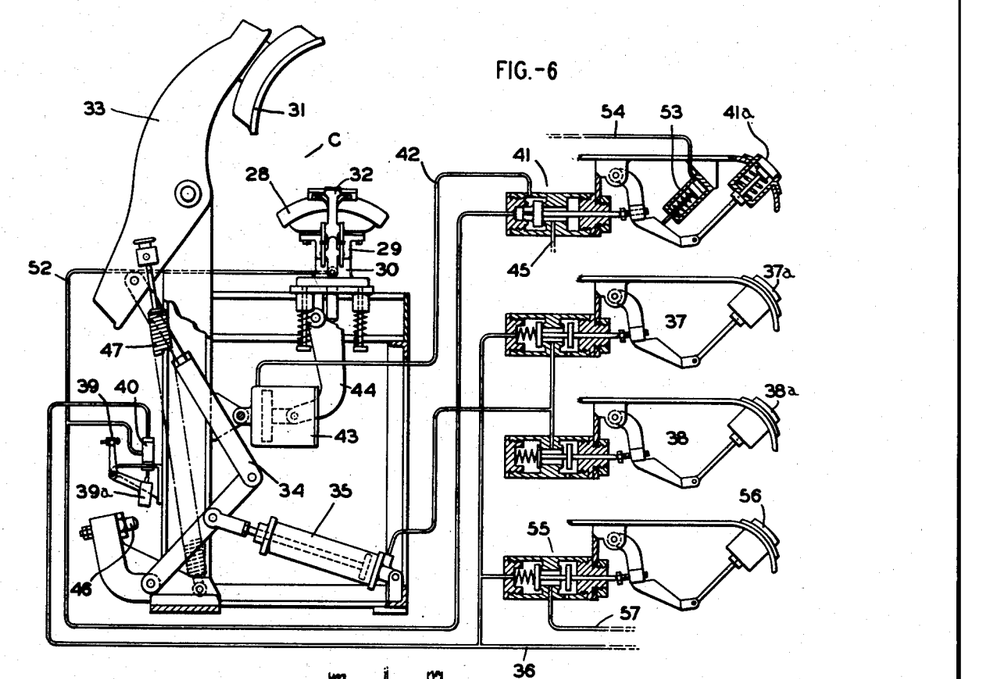
Fig. 6 is an end elevation of a sleeve press showing the control in diagrammatic form.

The press operating mechanism is of a known type wherein the pressing head is carried by a lever 33 pivotally mounted in the frame and oscillatable by a toggle 34 which in turn is actuated by a fluid pressure motor 35. The pressure fluid for this motor is supplied through conduit 36 and a pair of valves 37, 38 in parallel relationship to give a safety two-hand control as is well understood in this art. Buttons 37a and 38a actuate their respective valves which are normally in fluid cut-off position when the bucks are released. Supply of fluid to motor 35 straightens the toggle 34 to an over-center position toward the rear at which time the toggles engage a bell crank 39 which through a spring pressed plunger 39a opens a valve 40 to supply through normally open valve 41 and conduit 42 pressure fluid to motor 43 which acts through lever 44 against a pin depending from frame 29 so as to raise the bucks into engagement with the pressing heads. To release the press, button 41a is temporarily depressed to shut off the flow of fluid through valve 41 and to connect motor 43 with exhaust at the outlet port 45, whereupon a spring pressed plunger 46 followed by springs 47 cause opening of the press.

The clamps 32 are pivotally mounted in brackets at 48 and below the pivots are connected with a pin 49 which is combined with a compression spring so as to form an over-center device adapted to hold the clamps in the released position shown in full lines, Fig. 7, or in clamping position against the end of buck 28, shown in dot-dash lines depending upon where they have been placed by the operator or by the actuating mechanism. A trigger 50 has its upper end located in position to kick the clamp 32 to released position by means of servomotor 51 which is supplied with pressure fluid from a conduit 52 which is supplied with fluid by operation of valve 40. Since the servo-motors 51 are closer to valve 40 than motor 43 it follows that the clamps 32 are released just before the press is finally sealed or closed.

The servomotor shown at 53 in Fig. 6 is provided with a fluid connection 54 the control for which is located at another press, in this instance at the cuff press D, so that if desired pressure fluid may be released by the operator at press D so as to actuate the servomotor 53 at press C causing the same releasing operation as depression of button 41a.

Another valve mechanism is shown at 55 operable by button 56 to send pressure fluid through conduit 57 to a release servomotor analogous to 53 at another press, such as the cuff press D.

Cuff and gusset press

Figures 9, 10:
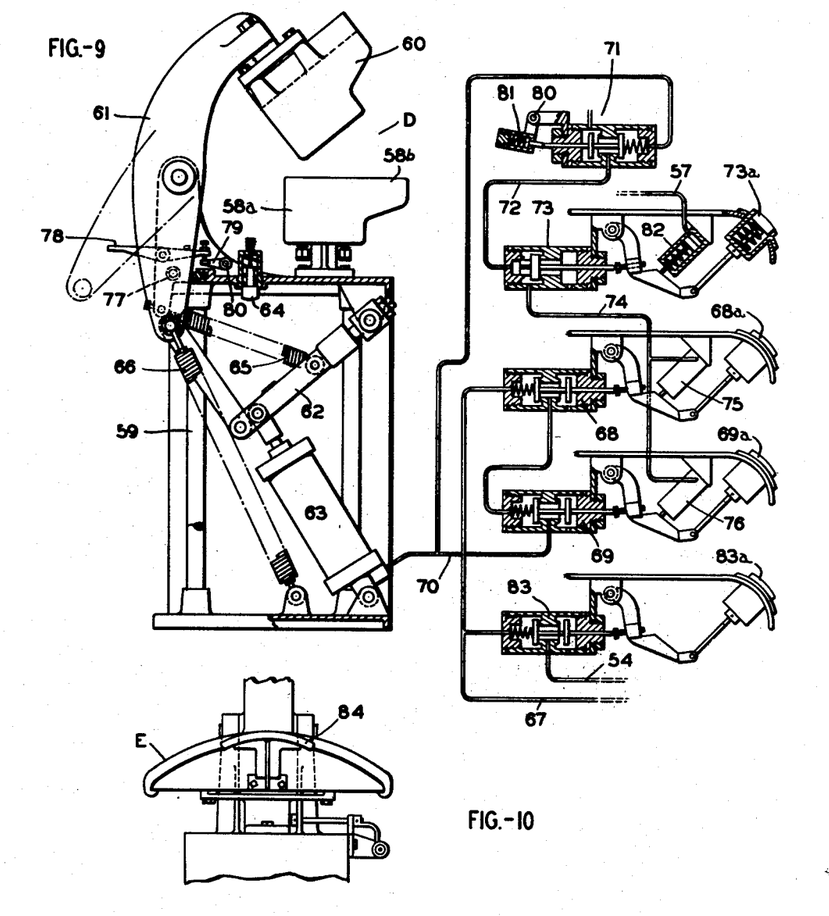
Fig. 9 is a side elevation of a head pressure type cuff and gusset press showing the control in diagrammatic form.
Fig. 10 is a fragmental front elevation of the buck of the collar press.
Figure 11:
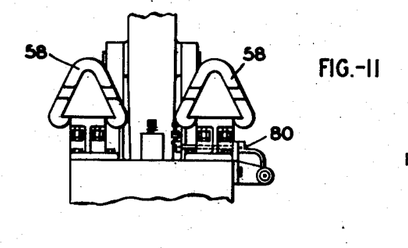
Fig. 11 is a fragmental front elevation of the buck of the cuff and gusset press of Fig. 9.

The cuff and gusset press shown at D, Fig. 1, is shown more in detail in Figs. 9 and 11. In this case the bed or buck members 58 are mounted to freely oscillate on immovable pivots on the frame 59 to equalize ironing pressure. These are separated bucks of inverted V-shape viewed from the front of the press as best seen in Fig. 11. The rear portion of the buck 58a is adapted to receive a cuff while the front portion 58b extends along the gusset portion of the sleeve so as to give a finer finish to that portion. Complementary coacting head members 60 are mounted on a yoke or head lever 61 pivotally carried by the frame and oscillatable into and out of pressing relation with the bed members, for ironing the cuffs, by means of a toggle 62 which is actuated by a fluid motor 63. A spring pressed snubber 64 is engaged just as the toggle straightens to place the head in engagement with the buck. Springs 65 and 66 normally open the press.

Pressure fluid is supplied to motor 63 from conduit 67 through valves 68 and 69 in series, and then through conduit 70 to the motor. These valves are controlled by buttons 68a and 69a respectively, in a manner to give safety two-hand control. A third or maintaining valve 71 is operated when the press is safely closed to supply fluid from conduit 70 through conduit 72, normally open valve 73 and conduit 74 to servomotors 75 and 76 which when energized hold valves 68 and 69 respectively in fluid supply position. The means for operating valve 71 comprises a pin 77 on the head lever 61 which, when the press is safely closed, engages lever 78 which in turn operates crank 79 to oscillate shaft 80 which in turn carries a spring pressed plunger 81 adapted to engage the stem of valve 71. To open the press, button 73a is depressed so as to close valve 73 and to exhaust servomotors 75 and 76 so that fluid is exhausted from motor 63 permitting the press to open.

Means is provided for opening press D from press C as previously explained and as here shown it comprises the motor 82 supplied by fluid from conduit 57 leading from press C so that valve 73 may be manipulated to open press D by the operation of button 56 at press C.

Means is also provided for opening press C from press D if desired and includes valve 83 operable by button 83a to supply fluid from conduit 67 to conduit 54 which leads to the release valve at press C.

*Collar press*

The collar press E is similar in all respects to the cuff press just described except that the buck and coacting head are of different design. The buck is shown in plan view in Fig. 1 and in front elevation in Fig. 10. The shape is such that it permits what is here called the "collar portion," i. e., either the neckband of a negligee shirt or the collar and neckband of a collar-attached shirt, to be laid out for a smooth finish. The pad 84 in front of the buck merely supports the body of the shirt while the collar is being pressed, it being understood that there is no coacting head portion for the pad 84. The control buttons for the press E are exactly like those shown in Fig. 9 including the tandem connections which in this case permit the opening of either press E or press F by the operator standing at the other press. The buttons of press E have been given the same reference characters as similar buttons of press D but with a prime suffix.

*Body press*

Figure 8:
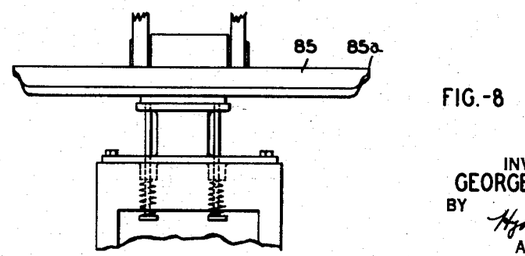
Fig. 8 is a fragmental front elevation showing the buck of the body press.

The body press F shown in Figs. 1 and 8 is exactly like the sleeve press shown in Fig. 6 except for the shape of the buck and coacting head. These have the form shown at 85 in Figs. 1 and 8 where one or both ends of the buck are shaped to iron enough of the yoke to overlap the portion ironed on the front press. Either end may be provided with a projection 85a adapted to iron into the back yoke at the collar line when the back is draped on the buck with the yoke toward the end of the buck. It will be understood that this buck is suitable for ironing the back and the sides of the shirt under the arms. The tandem connections for this press are those shown in connection with buttons 41a and 56 of Fig. 6 and as mentioned before permit tandem operation of presses E and F. The buttons of press F have been given the same reference characters as similar buttons of press C but with a prime suffix.

*Front press*

Figure 18:
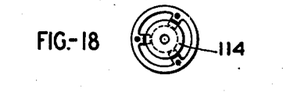
Fig. 18 is a detail sectional view taken on the line 18—18 of Fig. 17.

The front press is provided for ironing simultaneously both halves of the front of the shirt including the front yoke portion overlapping the back yoke already finished and all the rest of the front including the front tails. This press is shown in Figs. 1 and 12 to 15 with a diagram of some air control circuits in Figs. 17 and 18. In general, the press corresponds to that shown in Patent No. 1,997,219 granted April 9, 1935, to Oscar W. Johnson and includes certain features of my own prior Patent No. 2,139,066 granted December 6, 1938. Reference may be had to these prior patents for a full and complete description of any apparatus here disclosed and as to which further information is desired. A brief description will be sufficient for present purposes.

On the post 86 is rotatably mounted a frame 87 which supports on opposite arms two pressing beds 88, each mounted for tilting about a pivot pin 89. In a fixed portion of the frame is mounted a heated chest 90 adapted to coact with either of the beds 88 when brought in registry therewith. A fluid motor 91 actuates a piston rod 92 which engages a post connected with bed 88 so as to raise the bed into pressure engagement with the chest. The motor 91, when its piston moves upwardly raises rod 93 (Fig. 13) to turn bell crank 94 in a clockwise direction so as to load spring 95 and hold it loaded or cocked by means of another bell crank arm 94a which engages behind the trigger 96. Then when the piston of motor 91 falls at the end of a pressing operation the pin 93a moves downwardly and releases the frame 87 to the action of spring 95 which rotates the frame 87 a half revolution carrying one bed 88 into pressing position while the other bed moves away from the chest to dressing position.

A treadle 97 is so connected with the control mechanism that when the operator has dressed a shirt on the bed 88 in dressing position, she steps on the treadle 97 which causes the bed 88 in pressing position to become disengaged from the chest 90 after which the frame rotates a half revolution and the bed 88 now in pressing position is moved up against the chest and the bed 88 in dressing position is tilted to a convenient angle so that the operator may remove one shirt and dress another. Connected with treadle 97 is linkage 98 which is connected with a block 99 properly guided for vertical movement and normally urged upwardly by spring 100. The upper face of the block is provided with a conical shaped recess 99a into which is adapted to fit either one of two conical shaped pins 87a on the frame 87. This holds the turret frame in properly registered position. When the treadle 97 is depressed to move block 99 downwardly an oscillatable finger 101, pivotally mounted on block 99, moves toward the right as viewed in Fig. 15 to carry branch 101a beneath bar 102 thus holding block 99 depressed. When the rotating turret moves the other pin 87a into position the pin support 87b cams the finger portion 101b toward the left as viewed in Fig. 15, thus permitting block 99 to rise and engage each pin 87a as it comes into registering position. The finger 101 is cut away at its mid portion so as to permit block 99 to rise.

The treadle 97 has operative connections with another treadle 103 and thus through lever 104 operates control valve 105 for motor 91. This series of connections also includes a rod 104a (Fig. 12) which engages with a suitable opening in frame 87 only when the beds are in proper position. This is a safety device which prevents operation of valve 105 unless one of the pressing beds is in registration with the chest 90.

The parts shown at 106 form a snubbing device of the type shown in Patent No. 2,202,483, granted May 28, 1940, to James M. Dewey.

Figure 14:
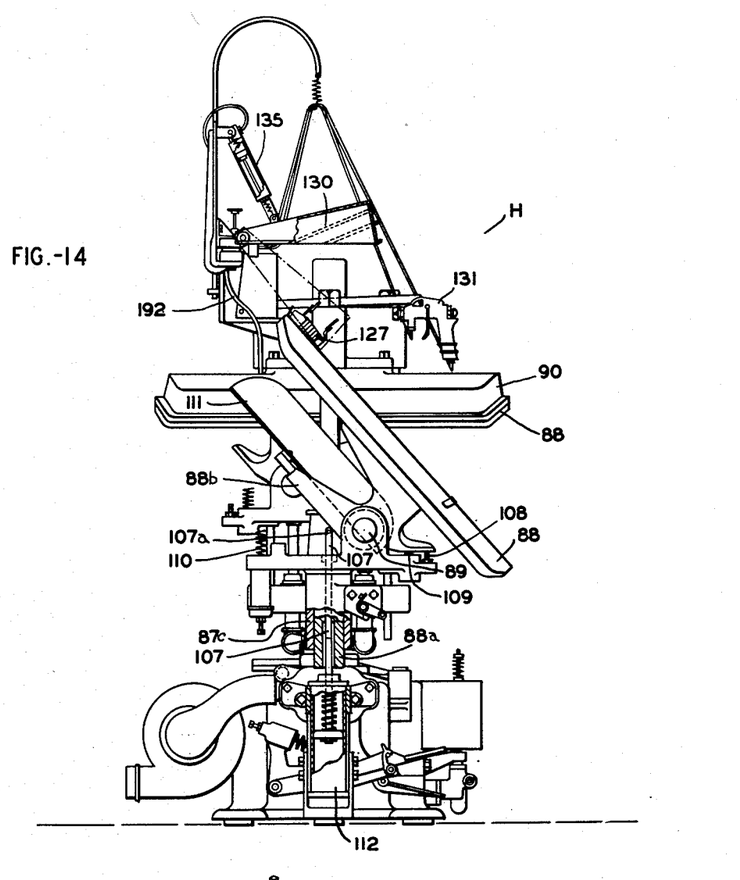
Fig. 14 is a side elevation of the front press looking from the left side of Fig. 12.
Figure 15:
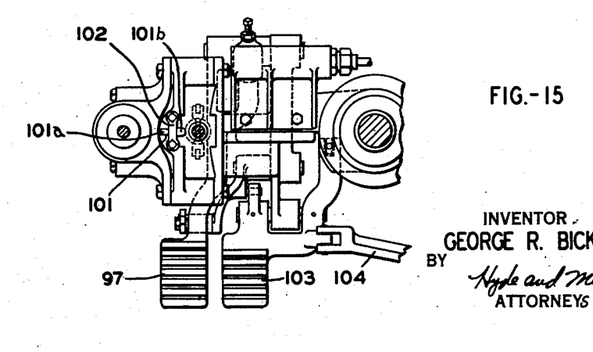
Fig. 15 is a section on the line 15—15 of Fig. 12.

The mechanism shown here for automatically tilting each buck 88 as it comes into pressing position comprises a post 88a extending down from each bed for engagement by piston rod 92 as previously described. This post works in a sleeve 87c of the turret frame 87. Each pedestal post is bored out as shown in Fig. 14 to receive a rod 107 which is provided with a small cross pin 107a in its upper end which fits into a recess in the pedestal when the rod is in its lowermost position to limit movement in that direction. The upper end of this rod engages a branch member 88b of the bed so that upward movement of rod 107 rotates the bed clockwise as viewed in Fig. 14 about the pivot pin 89 to tilt it to a position approximately 45° to the horizontal where bed movement is limited by stop pin 108. A cushion spring 109 is provided to check the motion as the buck approaches the tilted position. Another cushion spring 110 is provided for engagement by branch 88b to cushion the movement of the buck into horizontal position. A table or pan 111 is provided for holding portions of a shirt dressed on the buck 88 and this table tilts with the buck.

For moving rod 107 upwardly a fluid motor 112 is provided having a piston rod adapted to enter the bore of post 88a so as to engage rod 107. The control system for this motor is shown diagrammatically in Fig. 17. The valve 105 is a combination inlet and exhaust valve adapted to admit air from a source 113 through a flutter valve 114 to conduit 115 and thence to motor 91. Conduit 116 is for exhaust. The supply of pressure fluid for motor 112 is by way of conduit 117 (under control of valve 105). From conduit 117 the fluid passes through conduit 118, needle valve 119, conduit 120, check valve 121 and conduit 122 to motor 112 beneath the piston thereof to raise the rod 107 and tilt the bed 88 in dressing position. When valve 105 is operated to open exhaust 116a, motor 112 is at first exhausted rapidly through open conduit 123 and check valve 124 until the piston of motor 112 drops below the conduit connection for 123. From then on the fluid beneath the piston of motor 112 is somewhat compressed and acts as a snubber for the balance of the motion as further exhaust is through conduit 122, needle valve 125 and check valve 126.

The purpose of flutter valve 114 is to provide sufficient restriction of the flow to motor 91 to insure prompt action of motor 112. The action of flutter valve 114 is to move toward the right as viewed in Fig. 17 so as to restrict the flow of fluid to conduit 115 on the power stroke of motor 91 and valve 114 moves toward the left to give a full opening of conduit 115 on the exhaust stroke of motor 91.

It will be understood that in using this front press the operator dresses the two halves of a shirt front on the bed 88, while the latter is in tilted dressing position, securing the collar portion in proper position on the neckband block 127 by the use of spring clamp 128 and holding the tail portions of the shirt in somewhat diverging position by means of the clamp 129. As previously described the shirt front at this time is probably too dry for a proper ironing operation and therefore I have provided means for protecting the finished portions of the shirt and for quickly and positively dampening the entire shirt front while so protected and shielded. To this end I have provided a novel combination of protecting hood adapted to house the collar portion of the shirt, while moisture is provided by a preferably manually controlled spray gun to the shirt front. Meanwhile the sleeves, cuffs, and other body portions of the shirt are shielded from moisture by being folded behind the bed 88 and resting on the pan 111.

Figure 12:
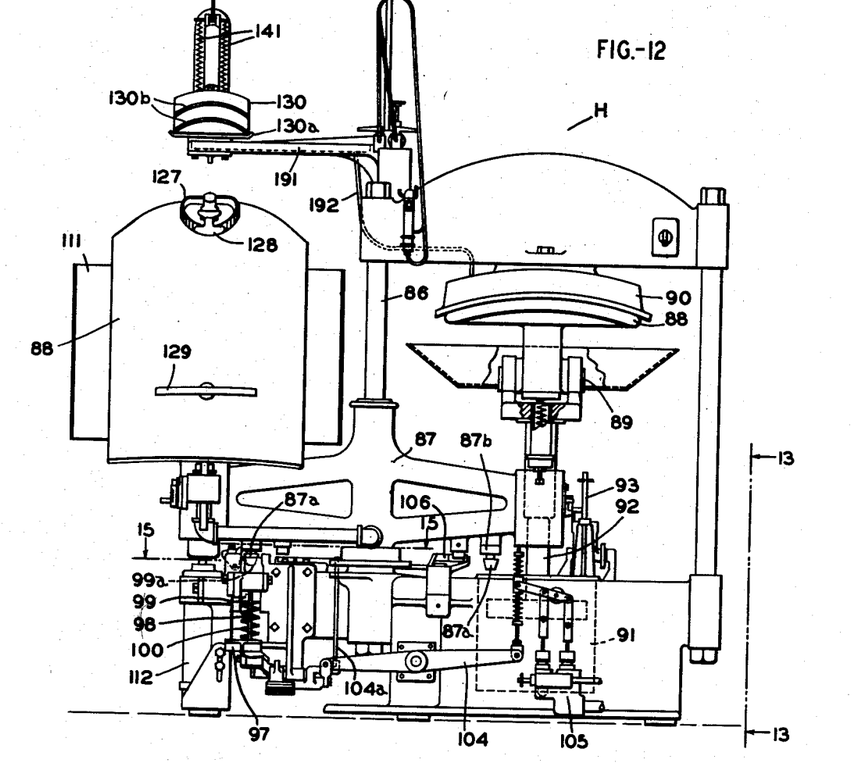
Fig. 12 is a front elevation of the turret type front press.
Figure 13:
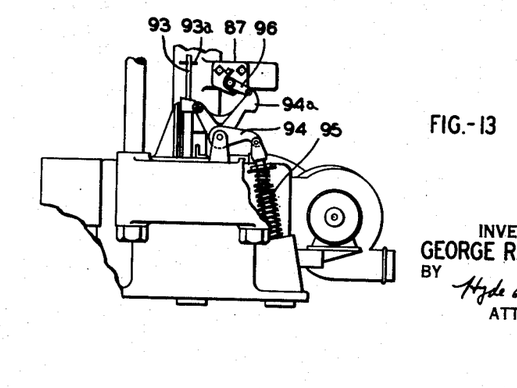
Fig. 13 is a fragmental view looking in the direction of the arrows 13—13 of Fig. 12.
Figures 16, 17:
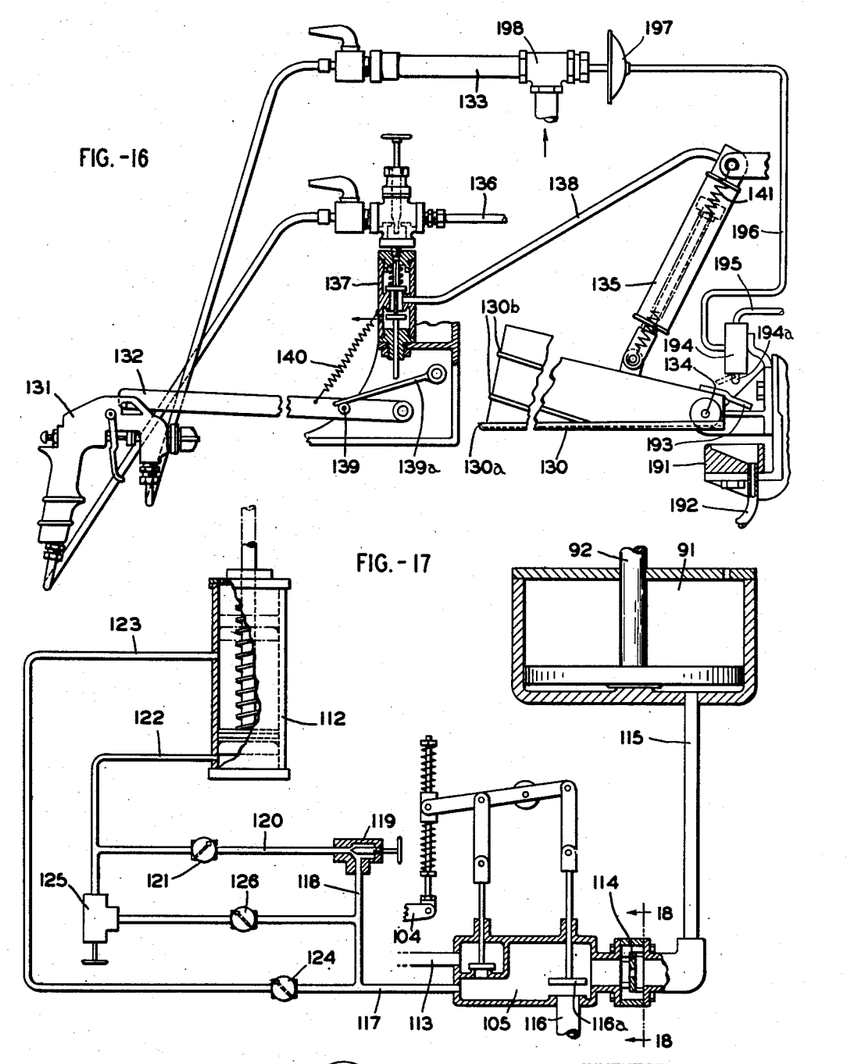
Fig. 16 is a diagrammatic layout of the control for the collar protecting hood and spray dampener shown in Figs. 12 and 14.
Fig. 17 is a diagrammatic layout for the control of the front press of Figs. 12 and 14.

The hood and spray dampening devices are best shown in Figs. 12, 14 and 16. The hood 130 is adapted to fit over and around the collar portion of the shirt so as to completely enclose it. The operation of this hood is here shown as automatic upon removal of the spray gun 131 from its supporting rack 132. This spray gun through a flexible connection is provided with water from conduit 133. The hood 130 is pivotally mounted at 134 on a fixed support arm 191 and is oscillated by means of fluid motor 135. The supply of pressure fluid for this motor is from conduit 136 through valve 137 and conduit 138. Valve 137 is normally in fluid exhaust position as shown in Fig. 16. The stem of this valve is adapted to be engaged by a lever 139a which is moved upwardly by engagement with a pin 139 on rack 132 when spray gun 131 is removed from the rack. A spring 140 normally urges the rack upwardly to cause this valve opening action. It will be obvious therefore that when the operator has dressed a shirt on the bed 88 and removes the spray gun 131 to dampen the shirt front, the hood immediately is moved downwardly from the position shown in full lines Figs. 12 to 14 to that shown in dotted lines, Fig. 14, so as to completely house and protect the collar portion of a shirt supported on the neckband block 127. Then when the gun is again placed on the rack, motor 135 is exhausted through valve 137 and the hood is returned by springs 141 to its original position.

Means may be provided to prevent spraying of the shirt until the hood has fully reached protecting position. For this purpose a tongue 193 is provided at the rear end of hood 130 adapted, when the hood moves down to protecting position to engage the stem 194a of a valve 194 just like valve 137. This admits air from line 195 to line 196 and diaphragm 197 to open a normally closed water valve 198. Thus water is available to the spray gun only when the hood is fully lowered to protecting position.

Means may be provided for draining away drops of moisture which may be deposited or condensed on the hood surface. For this purpose a lip 130a may be turned up all around the lower edge of the hood and beads 130b may be formed at an angle to the lip to conduct all moisture to one drain when the hood is elevated. As shown in Fig. 16, the support arm 191 may be formed as a trough to provide such a drain, and tube 192 serves to conduct the moisture to heated chest 90 where it is vaporized.

The above described collar protecting hood and spray form the subject of a copending application Serial No. 377,924, filed February 7, 1941, by Fred A. Heidenfelder and myself.

*Folding table*

The folding table indicated generally at J in Fig. 1 is more fully disclosed in Figs. 19 to 23 inclusive, and forms the subject matter of a copending application of Fred A. Heidenfelder and myself, Serial No. 377,925, filed February 7, 1941, to which reference may be had for further description if necessary or desirable. A brief description will be given here.

Figures 19, 20, 21:
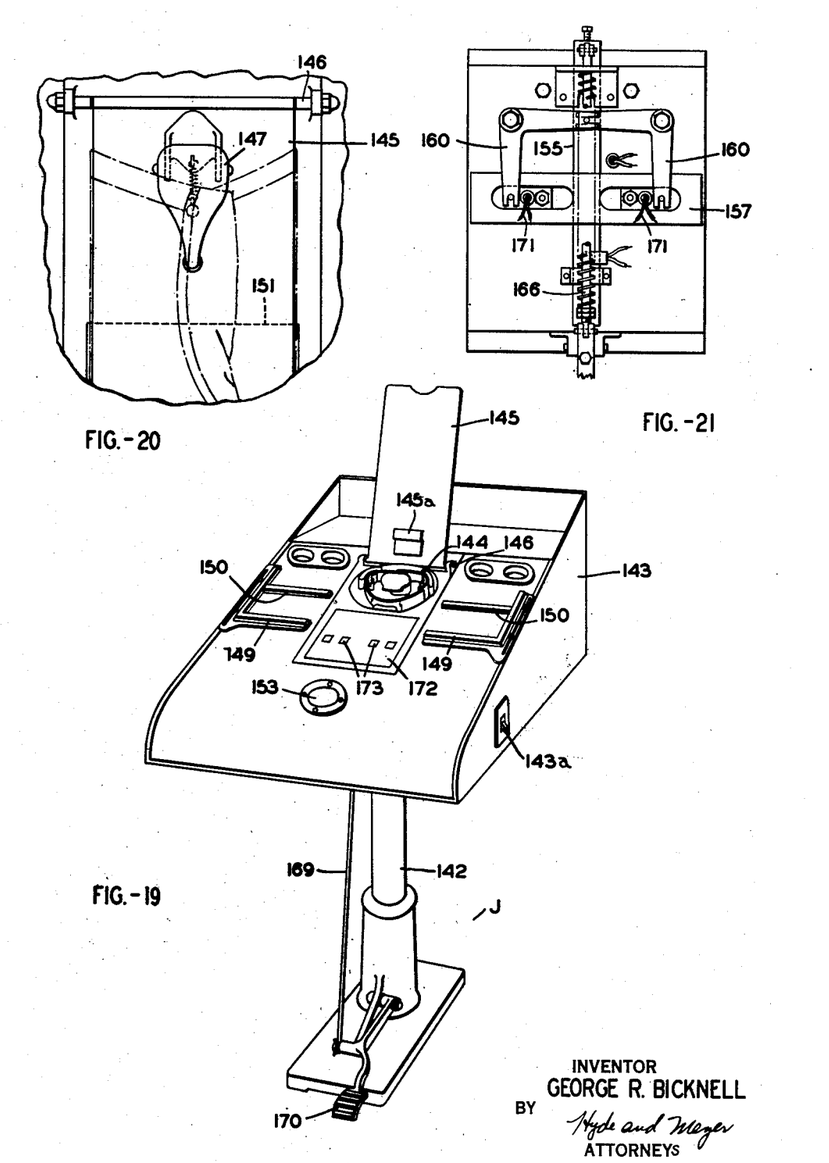
Fig. 19 is a perspective view of the folding table.
Fig. 20 is a fragmental plan view of a portion of the top of the folding table with the folding plate in the folding position, showing in dot-dash lines a shirt folded thereon and showing the clamp for holding the folded halves of the shirt in position while the tail is being brought up and a holding tape applied.
Fig. 21 is a fragmental detail bottom plan view of the collar holding and forming mechanism looking in the direction of the arrows 21—21 of Fig. 23.

On a pedestal 142 is mounted a pulpit type table 143 which, for convenience of operation and for lessening operator fatigue, has a top sloping toward the operator. The pedestal may be adjustable in its base to vary the height of the top, and the top may be tiltably adjustable on the pedestal to vary its angle of inclination. Generally speaking, the operator takes a substantially finished shirt and lays it face down on the table top with the collar portion engaged around the expanding block assembly 144, centering the buttonhole and button strips of the shirt by light passing through the shirt from a bulb 152 beneath the table shining through a lens 153 in the table top and centered below plate 145. She then places a rectangular cardboard in the clip 145a of the plate 145, after which the plate 145 is moved from the position shown in Fig. 19 down upon the back of the shirt, moving about the pivot support 146. She then folds each half of the shirt over plate 145 and on top of the upper surface thereof as indicated in Fig. 20, at which time the folded portions of the shirt may be held temporarily in position by overcenter clamp 147 which is carried by the upper face of plate 145, the clamp being held in either open or clamping position by the spring 148. The operator then takes a paper band which lies between the members 149 and 150 on the table top and fastens the band around the folded shirt as indicated at 151 in Fig. 20. The shirt is now completely folded and may be slipped off the free end of plate 145. The members 149 and 150 may have soft rubber inserts on their upper faces to prevent a shirt overlying them on the table from slipping down the incline.

The expanding block assembly 144 is like that shown in Patent No. 2,192,786 granted March 5, 1940, to Homer P. Campbell, to which reference may be had for a more complete description. Briefly stated a base plate 154 rigidly attached to the table top and substantially parallel thereto supports a sliding bar 155 which actuates the front block 156. Extending at right angles to bar 155 is a guide 157 which supports the two side blocks 158 and 159. These side blocks are connected by bell cranks 160 with the sliding bar 155. Two plates 161 hinged to block 156 ride in guiding grooves in blocks 158 and 159 so as to form a substantially continuous supporting surface between the front block and the two side blocks. Other plates 162 connected one with each of the side blocks overlap at the back of the neckband to complete the supporting surface there. A central block 163 supports the portion of the shirt yoke immediately back of the neckband when the shirt is in position. The blocks 156, 158 and 159 are normally urged to their outermost position by a spring 164 which engages between a bracket 165 and a collar or nut on an operating link 166 which is connected at one end with the bar 155 and by means of a link 167 rigidly connected with link 166 is pivotally supported at the point 168. A connecting rod 169 leads downwardly to the treadle 170. Depression of pedal 170 causes link 166 to move rearwardly thus simultaneously contracting the blocks 156, 158 and 159 so that the operator may place the collar portion of a shirt in position outside the blocks and upon release of the pedal 170 the spring 164 will expand the blocks to hold the collar portion of the shirt securely. All of these blocks may be electrically heated if desired, there being connections shown at 171 for this purpose. Obviously any ironing effect produced at this time by these parts would be substantially on vertically disposed surfaces provided by the blocks and their associated overlapping plate members.

Figure 23:
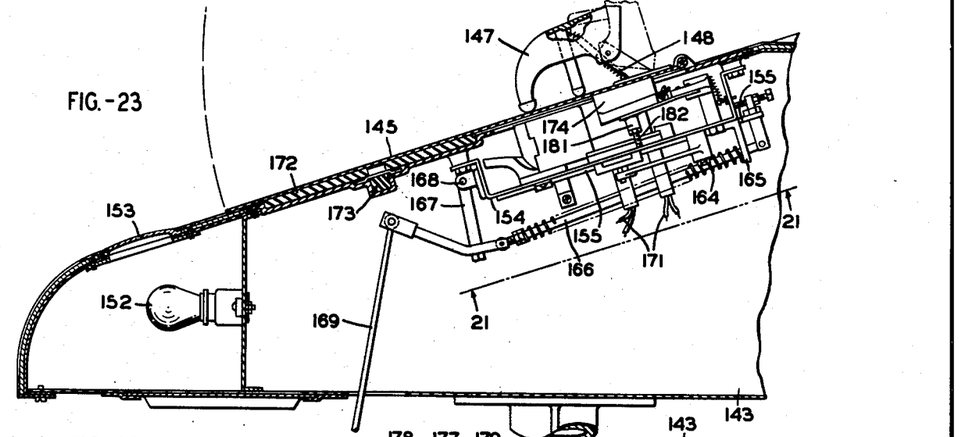
Fig. 23 is a fragmental sectional view taken on the line 23—23 of Fig. 22.

Means is provided for firmly holding plate 145 in clamped position upon the shirt after it has been moved there by the operator. To this end a sponge rubber block 172 is placed below the assembly 144 recessed in the surface of the table top, preferably with the surface of the sponge rubber slightly above the surrounding surfaces as best seen in Fig. 23. Slightly below the surface of the sponge rubber is a pair of magnets 173 which attract the steel plate 145 when it has been placed in clamping position over the shirt. This clamps the shirt tightly against the sponge rubber 172 and at the same time may be utilized to produce an ironing effect as will presently appear.

Figure 22:
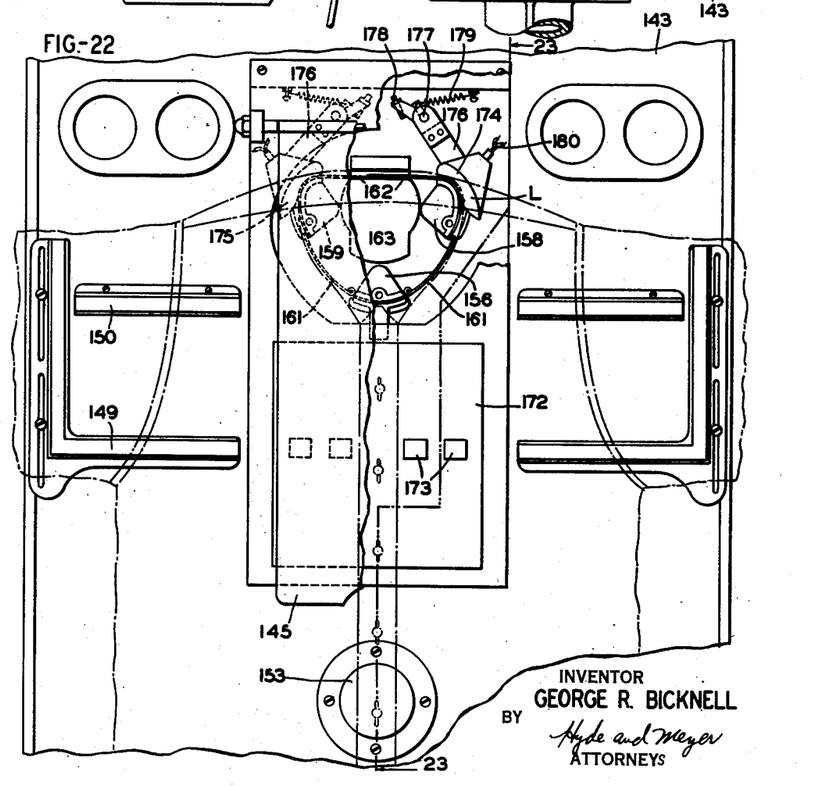
Fig. 22 is a fragmental plan view of the top of the folding table showing in dot-dash lines a shirt dressed thereon for folding and a fragmental portion of the folding plate in folding position. Parts of this view are broken away to show a heated yoke ironing shoe.

During the ironing of a shirt in the manner herein described, small roughly triangular portions at the rear of the front yoke adjacent the neckband, as indicated at L in Fig. 22, at times may not be completely or satisfactorily ironed, although this is unusual. To meet the condition, should it arise, and although they are not always necessary, I have therefore provided a pair of heated ironing shoes 174 and 175 for ironing these small portions while the shirt is being folded and without conscious effort on the part of the operator. Each of these shoes is mounted preferably on a spring steel strip 176 which is pivotally supported at 177 and provided with a stop pin 178 adapted to engage against the inner rear surface of the base plate 154 to limit the motion of the ironing shoes inwardly. This provides space between the ironing shoes and the blocks 158 and 159 for properly positioning the shirt in the first instance. Springs 179 urge the ironing shoes inwardly so that they will engage close up against the neckband of various sizes of shirts. The inner faces of the shoes correspond roughly with the outer faces of blocks 158 and 159 so that the shoes may iron close up against the neckband. Means is provided for heating the shoes and in the present instance this is electrical means supplied with current through the wires 180.

The spring strips 176 preferably are turned slightly upwardly so that the shoes resiliently press against the shirt when it is laid down upon them. Obviously when the plate 145 is moved into clamping position it holds the shirt firmly against the ironing shoes aided by the magnets 173. In this position of the parts the thickness of the shirt between plate 145 and the ironing shoes and the cardboard around which the shirt is folded provide a resilient ironing bed somewhat similar to the padding on an ordinary ironing buck.

Preferably, to hold the shoes 174 and 175 more firmly in position during this ironing operation, each of them is provided on its lower face as best seen in Fig. 23, with a boss 181 in which is threaded a stud 182 which is adjustably fixed in position to engage against the base plate 154 during the ironing operation.

If desired the ironing shoes or blocks and the lamp 152 may be wired in series and controlled by switch 143a so that the light is a warning that the shoes are energized.

Shirts in process

Means is provided for holding shirts partly finished in position between the various operators, to provide some latitude in the manipulating and controlling motions of the various operators working on a number of shirts passing through the unit. For instance when the first operator finishes with a shirt she places it on the rest 183 at the left-hand side of the collar press E. When the second operator removes a shirt from the collar press she places it on a table at the right thereof at 184. When the second operator removes a shirt from the body press F she places it on the rack G which may or may not be provided with a yoke or neckband supporting block 185. When the third operator removes a shirt from press H she folds over the collar and buttons the front button thereof and places the shirt on the collar stand I with the collar embracing the top of the stand. This stand may have a polished metal surface internally heated if desired. The rack K simply comprises a revolving head 186 on a pedestal 187 and is for receiving shirts which need repairs before folding and is used for temporary storage until one of the operators has time to make the necessary repairs.

Operation

Referring to Fig. 1, while the invention is not limited to the particular means and method illustrated and described, the preferred steps in operation utilizing the method and equipment here disclosed, are as follows:

Operator No. 1 occupies one of the two positions indicated at 188. It will be assumed that as she begins her group or cycle of operations, presses C and D are closed upon work in them, and that no sleeves are on the forms B. The operator first takes a shirt from the damp box A and drapes the sleeves thereof on the sleeve forms B with the seams on the edges toward her. Assuming that other shirts are continuously passing through the system she then steps to the sleeve press C and presses the release buttons 41a and 56 which causes presses C and D to open simultaneously. She then removes the sleeves from press C and holds that shirt in her left hand while removing the cuffs from press D and hanging that shirt with her right hand on the rest 183. She then lays the cuffs of the shirt which she has just removed from press C on the bucks of press D and closes that press. She then steps to the sleeve form, removes the sleeves therefrom and lays the sleeves of that shirt on press C with the plackets upwardly and with the cuffs held beneath the clamps 32 as previously described. With one hand she then pinches the shoulder at the exact folding line, while with the other hand she grasps the seam at the armpit and draws the sleeve taut across the back. This not only facilitates making a rapid and smooth lay but also locates the sleeve crease to coincide with the shoulder crease which is later made during the folding operation. The smooth lay of the sleeve is more readily accomplished when the outer end thereof is held in the cuff clamp. She then closes press C and steps to the damp box A to take the next shirt, which completes her group or cycle of operations. Her duties have kept her comfortably busy and her machine in operation during substantially the full period of a standard time interval, say thirty to thirty-two seconds.

Operator No. 2 moves between the positions indicated at 189 in Fig. 1. It will be assumed that as she begins her group of operations, press E is open and empty, while press F is closed upon a shirt arranged upon the board with a back lay. This operator takes a shirt from the rest 183, lays the collar on press E and closes that press and quickly opens out the shoulders of the shirt as it rests on the pad 84. At the same time that the operator closed the press E she pushed the tandem connected button at press E to cause opening of press F at the same time. On this press lies a preceding shirt which has had the back portion ironed on the buck 85. The operator therefore next steps to press F and with the shirt already there makes a side body lay under one of the arms and closes press F. She then opens that press and makes the other side under-arm lay and closes the press again. She then grasps with her left hand the shirt on the table at her left at 184 while at the same time opening the press F by pressing the button 41a' with her right hand. As the press opens she grasps the shirt just ironed with her right hand and swings it over to the yoke rack G at the same time bringing the shirt in her left hand over to the press F and making the back body lay, after which she closes press F, at the same time pushing the tandem control button 56' to open the press E. She then returns to this press, preferably dampens with a dauber the material just back of the collar band, and then places the shirt on the table at 184. As she places this shirt on the table with her right hand she removes the next shirt from the rest 183, which is the first step in her next group of operations. She also, as well as her machines, has been comfortably busy during substantially all of the same standard time interval, say thirty to thirty-two seconds.

Operator No. 3 moves between the positions indicated at 190 of Fig. 1. It will be assumed that as she begins her group of operations, one of the work receiving boards stands empty, in tilted position, before her, while the other board is in closed position and holds another shirt in pressing relation with the heated head, at the opposite end of the turret. This operator takes a shirt from the yoke rack G and drapes the shirt over one of the tilted beds 88 of the press H, making sure that the sleeves are in protected position behind the bed. This draping of the shirt includes clamping the neckband under the clamp 128 and expanding the collar block and clamping the tails under clamp 129. She then grasps the spray gun 131 and quickly sprays the two halves of the shirt front, at which time of course the collar protecting hood automatically comes into protecting position. She then replaces the gun on the rack which causes the hood to rise, after which she completes the dressing of the shirt, drawing the fronts taut and smooth beneath clamp 129. She then steps on treadle 97 which causes the beds 88 to change positions, after which the shirt she just dressed goes into pressing engagement automatically with the heated chest 90 as has already been described. As the turret frame swings the ironed shirt toward her she loosens the collar clamp as the bed comes around and then releases the shirt tails from the clamp 129 and removes the finished shirt as the bed begins to tilt. Then grasping the collar band between both hands, she turns the collar, draping the shirt over the collar rack I. This completes her group of operations and she and her machines also have been comfortably busy during substantially all of the same standard time interval.

Operator No. 4 stands in front of the folding table, at its lower end, in the position shown by the circles at the right of the table J in Fig. 1. As she begins her group of operations, the folding table is empty and the folding blade is in its elevated position. This operator first buttons the collar of the shirt on the collar rack if this has not already been done by operator No. 3, and preferably also buttons the first and third buttons down the front of the shirt. She then places the shirt face down on the folding table while stepping on the treadle to contract the collar form. With the collar in position she releases the treadle and centers the button and buttonhole strips over the lighted lens. She then places a chipboard in plate 146 and drops this down on the shirt. She then folds the two halves of the shirt, holding them with clamp 147 while she folds the tail portion up over the two halves of the shirt and then fastens the band about the mid portion of the completely folded shirt. She then releases the clamp 147, steps on the treadle 170 and removes the shirt from the plate 145, after which she may insert a cardboard collar protector inside the collar portion if desired. She then places the folded shirt on a truck or rack, which completes her group of operations, she and the table which she operates also having been comfortably busy during substantially all of the standard time interval.

Experience in actual use of this system, in the regular operation for profit of a commercial laundry, has demonstrated that it is easily possible, using the apparatus and methods here disclosed, to turn out a completely finished shirt every thirty seconds, after the operators have become accustomed to manipulation of the shirts and the apparatus. It has also been demonstrated that it is possible to maintain an average production of one hundred shirts per hour or better, using the four operators as described, without in any way overworking the operators and in fact giving them time for rest periods. At the same time the shirts have a finer ironed finish than is usually provided where hand ironing is resorted to, whereas in the present instance no hand iron is provided or needed. Indeed the quality of work is as good or better than ever before provided in mechanically ironed shirts and the number finished per operator per hour is greater than was possible previously on any unit of this general kind. I believe these unusual results, herefore impossible in the trade, are due to features of apparatus arrangement, shirt manipulation, organization, distribution, sequence of ironing operations and timing of operations, not only to give shirt portions of multiple fabric thickness the necessary drying time for complete ironing, but to prevent single ply portions from losing their moisture en route to the apparatus provided to iron these portions.

Attention is particularly directed to certain features or characteristics of the method and apparatus of this invention, as follows:

In the first place, the various elements of apparatus, and their grouping, have been very carefully chosen or selected, taking into account the ordinary manner of operation of each thereof, so as to balance or equalize the duties of the several operators with respect to each other. In other words, the various machines and devices have been so selected and grouped, and their operation has been so organized and distributed between the several operators, that four operators of uniform and average skill are enabled each to perform all duties assigned to her in the operation of her group of devices, within the duration of a predetermined standard period, say 30 to 32 seconds, with a few seconds (four or five) to spare, as a factor of safety. Experience in actual practice with a large number of units of the kind described, operated in the manner described, has conclusively demonstrated that each operator is comfortably busy practically all the time, that no one of them is unduly hurried to keep pace with another, and that the unit as a whole consequently operates smoothly with no waste or lost time. All machines and devices are working or operating practically all the time, so that the total overhead investment is reduced to a minimum.

Second, the various mechanisms and devices are grouped from the standpoint of the ability of an operator of average skill to perform all the necessary duties of her group of duties, and not from the standpoint of the number of shirts which at any one time are under the supervision or control of a single operator. In other words, assuming the entire unit to be operating smoothly, as described, one operator, during the given standard period of time, may have a different number of shirts within her control than another operator. For example, in the unit described the first group of devices includes the sleeve forms B, the sleeve press C and the cuff press D, and the operator assigned to that unit has under her control, during the standard period of time, at least two shirts. That is to say, at the moment when she is ready to take another shirt from the damp box A, and before she takes it, she has one shirt with its sleeves under pressure in the sleeve press C and another shirt with its cuffs under pressure in the cuff press D. The sleeve forms B are empty, and she has delivered to the rack 183 another shirt, which may still be there or not, depending upon whether the second operator has taken it or not.

As to the second operator, assuming a shirt is still on the rack 183 and that she is just ready to remove it therefrom, she has at least two shirts under her control, to-wit, one in each of the presses E, F. Another may be lying on the shelf 184 awaiting its turn in the body press F, and still another may be hanging on the rack 185 waiting for the third operator.

As to the third operator, she always has at least two shirts under her control. Assuming she is just ready to remove a shirt from the rack 185, she has one shirt undergoing pressure in the press H and another one lying on the tilted board ready to be removed therefrom, and still another shirt may be hanging on either of the racks I or K ready for the fourth operator.

The fourth operator has one shirt under her control, to-wit, the shirt she is folding at the folding table J, together with a shirt or shirts on either or both of the racks I and K.

But, summing up, whether an operator operates one, two or three machines or devices, and whether during the standard period of time she has under her control one, two or more shirts, it is a fact that the several elements or devices have been so selected and distributed between the operators that the total time necessary for each operator to perform all duties assigned to her is approximately that of the standard period of time referred to, disregarding the few extra seconds allowed as a safety factor, as before referred to.

Third, the ironing steps or operations have been organized or distributed with particular attention to the difference in demands of the single thickness and multiple thickness portions of the shirt. Leaving out of consideration the front or bosom, including the tails, all ironed in one operation under the exclusive control of a single operator, the remaining portions of the shirt, all of which are ironed before the front, include, in addition to the single ply portions, the multiple thickness cuffs and collar portion. These multiple thickness parts have been distributed to two operators, one taking the cuffs and the other the collar portion, and in the group of operations which includes each, cuffs or collar portion, has been included enough work upon single thickness portions of the shirt to keep each of these two operators, and the machines which she controls, comfortably busy during substantially all of the standard time interval. A convenient apportionment of the single thickness parts of the shirt is to assign to one operator the sleeves, including the gusset portions, and to the other operator the shirt back and left and right sides, because, as described heretofore, the sleeves are completely ironed by two ironing operations, one on the forms and the other in the sleeve press, whereas the back and sides of the shirt require three separate lays or operations. Whether the operator who irons the cuffs also is assigned the duty of ironing the sleeves or that of ironing the shirt back and sides, is immaterial, both plans being permissible as before explained. But in any event each operator performs ironing operations upon both a multiple thickness part of the shirt and upon one or more single thickness parts. In each case the time devoted to ironing the multiple thickness part (either the cuffs or the collar portion) should be a major portion of the total standard time interval, while each of the ironing operations performed upon a single thickness part of the shirt (such as internal ironing of the sleeves upon the forms, or external ironing thereof in the press, or ironing of the back or either side of the shirt in the press) may be accomplished in a minor portion of the standard time interval, two or more of such operations following in succession during such interval. Such organization and distribution of the duties performed upon those parts of the shirt other than the front enables the first and second operators each to control and operate two or more different machines or devices and to control two or more different kinds of operations, with accurate apportionment of time, as between the several operations, in accordance with their kind.

Fourth, the several elements and devices of the unit, and their order and arrangement both in succession and with reference to each other are unusually convenient as to operation and of such nature as to conserve space, and inevitably produce the several ironing operations upon a single shirt in the proper order to protect finished portions of the shirt from being mussed or wrinkled during following operations.

Speaking first of the order of operations upon the shirt as it passes through a complete unit, it will be observed that in the specific arrangement and organization shown in the drawings the operations are as follows:

1. Partial drying of the sleeves on the forms B.
2. Ironing of the sleeves in the sleeve press C.
3. Ironing of the cuffs in the cuff press D.
4. Ironing of the collar or neckband in the press E.
5. Ironing of the body in several successive lays in the body press F.
6. Ironing of the front or bosom portion of the shirt in the press H.
7. Folding of the shirt at the folding table J, accompanied by certain additional simple machine ironing operations as described.

From the standpoint of conserving space it will be observed that all of the elements, as a group, are arranged generally in U-form or as a hollow square open at one side where the bosom press extends beyond the others, providing entrance to the space within the unit and a certain amount of extra space around the folding table J for passage of trucks for delivering damp shirts to the damp box A and in which other trucks may be stored to receive the finished product. At two points the operators work on the two sides of a right angle, the first operator operating both the sleeve press C and the cuff press D and the second operator controlling the collar press E and the body press F. This angular relation between two associated presses obviously is far more convenient for the operators and requires less bodily movement than when the presses are alongside each other both fronting in the same direction, or opposite each other face to face.

Again, on account of the rectangular arrangement of the entire unit, a series of similar units can be arranged alongside of each other with their open sides spaced at intervals along a single aisle, so that the total over-all area occupied by a plurality of units, taking into consideration the number of machines and operators involved in each unit, is a minimum per operator and per unit.

Of course it will also be realized that the racks 183, 185, and I and K, between successive operators, form safety valves, as it were, enabling the operators readily to adjust their operations to each other. On each of these racks a shirt finished by a preceding operator hangs until it is taken off by the following operator, and by shortening or lengthening the time the shirts hang on these various racks usually fast operators can drop back and slow operators can pick up so as to equalize the time of all operators in the same unit and produce smooth operation of the unit as a whole.

Further advantages will be apparent to those skilled in the art.

What I claim is:

1. The method of finishing damp shirt sleeves during the process of ironing a fully dampened shirt, comprising partially drying the damp sleeves in expanded tubular shape on heated forms which are shaped to define and thereby produce more or less definite sleeves seam folding lines, utilizing the defined fold lines in laying the sleeves flat in a press after their removal from said forms, and then hot pressing the sleeves flat to complete dryness, whereby the interior contacting surfaces of the pressed sleeves are prevented from sticking together but lie in close juxtaposition on account of said folding lines.

2. The method of finishing damp shirt sleeves during the process of ironing a fully dampened negligee shirt, comprising partially drying the damp sleeves in expanded tubular shape on heated forms which reduce the moisture content sufficiently to prevent the contacting interior surfaces of the sleeves from sticking together during subsequent pressing but to leave with the material sufficient moisture to produce a satisfactory pressing effect without the production of a rough dry effect, and thereafter hot pressing the still moist sleeves flat to complete dryness, thereby securing a uniformly high quality finish over each entire sleeve without rough dry effect and without the interior sleeve surfaces sticking together.

3. The method of finishing damp shirt sleeves during the process of ironing a fully dampened shirt, comprising first applying a heated surface to the interior surface of the sleeve for partially drying the same, and thereafter completing the drying by the application of a heated surface to the exterior surface of the sleeve, thereby not only drying the sleeves completely without the production of a rough dry effect, but also finishing both the interior and exterior sleeve surfaces and preventing the interior surfaces from sticking together.

4. That improvement in the method of mechanically ironing previously dampened negligee shirts by production line methods with three operators and with the total duty of completely ironing a shirt distributed among the several operators in such manner that each performs all of her duties and is comfortably busy during substantially all of a standard time interval, consisting in causing, by the manipulative and control efforts of the first two of said operators, each working independently of the other upon a different shirt in the line, the complete ironing of two sets of multiple thickness portions of a shirt (one set by each operator) by a machine ironing operation which continues through a major portion of the standard time interval, and during the same time interval, by like efforts of each of said first two operators, each again working independently of the other, causing the performance of a plurality of ironing operations all upon different single thickness portions, excepting only the front shirt portions of a shirt, thereby partially drying the shirt front, then spray dampening the shirt front, while shielding already ironed parts against dampening, to restore the moisture content of the shirt front to an amount suitable for satisfactory ironing results without the production of a rough dry effect, and finally, by a third operator, working independently of the first two, during the same time interval, upon the product of their earlier efforts, causing the ironing of the front of a shirt, thereby enabling the completion of the ironing of any given shirt during three successive time intervals, with the shirt front ironed last and without producing a rough dry effect thereon.

GEORGE R. BICKNELL.